United States Patent
Dwertmann

(10) Patent No.: US 9,209,728 B2
(45) Date of Patent: Dec. 8, 2015

(54) METHOD FOR THE SENSORLESS COMMUTATION DETECTION OF ELECTRONICALLY COMMUTATED ELECTRIC MOTORS

(75) Inventor: Ingo Dwertmann, Heilbronn (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/112,532

(22) PCT Filed: Apr. 20, 2012

(86) PCT No.: PCT/EP2012/057291
§ 371 (c)(1),
(2), (4) Date: Oct. 17, 2013

(87) PCT Pub. No.: WO2012/146541
PCT Pub. Date: Nov. 1, 2012

(65) Prior Publication Data
US 2014/0042945 A1  Feb. 13, 2014

(30) Foreign Application Priority Data
Apr. 26, 2011  (DE) .......................... 10 2011 017 517

(51) Int. Cl.
*H02P 25/08* (2006.01)
*H02P 6/18* (2006.01)

(52) U.S. Cl.
CPC ................ *H02P 6/182* (2013.01); *H02P 6/186* (2013.01)

(58) Field of Classification Search
CPC ............................... H02P 6/182; H02P 25/083
USPC ........................ 318/254.1, 400.1, 400.34, 459
See application file for complete search history.

(56) References Cited

U.S. PATENT DOCUMENTS

| 4,912,378 | A | * | 3/1990 | Vukosavic | ............... 318/400.04 |
| 5,796,194 | A | * | 8/1998 | Archer et al. | ............... 310/68 B |
| 2006/0214611 | A1 | * | 9/2006 | Wang et al. | .................... 318/254 |
| 2007/0013330 | A1 | | 1/2007 | Noh | |
| 2008/0197794 | A1 | * | 8/2008 | Vermeir et al. | ........... 318/400.06 |
| 2008/0252238 | A1 | * | 10/2008 | Otaguro | .................... 318/400.05 |
| 2009/0066278 | A1 | | 3/2009 | Arisawa et al. | |
| 2009/0230905 | A1 | * | 9/2009 | Proctor et al. | ............ 318/400.09 |
| 2010/0079909 | A1 | | 4/2010 | Gong et al. | |
| 2010/0201298 | A1 | * | 8/2010 | De Filippis | ............... 318/400.35 |
| 2010/0264862 | A1 | * | 10/2010 | Kitagawa | ................. 318/400.13 |

FOREIGN PATENT DOCUMENTS

| CN | 101461127 | 6/2009 |
| DE | 102007024354 | 12/2007 |

(Continued)

OTHER PUBLICATIONS

International Search Report for Application No. PCT/EP2012/057291 dated May 6, 2013 (3 pages).

*Primary Examiner* — Erick Glass
(74) *Attorney, Agent, or Firm* — Michael Best & Friedrich LLP

(57) ABSTRACT

The invention relates to a method for the sensorless commutation detection of electronically commutated electric motors, in which the phase current is interrupted for a blanking time in order to detect the zero passage. On the basis of the profile of the mutual induction voltage, a decay time, which is characteristic for a decay of the phase current, is determined within the blanking time and the start of the blanking time is determined as a function of the time difference between the decay time and the end of the blanking time.

15 Claims, 3 Drawing Sheets

(56) References Cited

FOREIGN PATENT DOCUMENTS

| | | |
|---|---|---|
| DE | 102007057746 | 6/2008 |
| DE | 102007040217 | 2/2009 |
| DE | 102008041856 | 3/2010 |
| EP | 0801463 | 10/1997 |

* cited by examiner

METHOD FOR THE SENSORLESS COMMUTATION DETECTION OF ELECTRONICALLY COMMUTATED ELECTRIC MOTORS

CROSS-REFERENCE TO RELATED APPLICATIONS

Not applicable.

BACKGROUND OF THE INVENTION

The invention relates to a method for sensorless commutation identification in electronically commutated electric motors.

In electronically commutated DC electric motors, the magnetic rotating field that is required for the rotary movement is controlled by electronics. The commutation times are dependent on the rotor position of the motor and can either be picked up by sensor or determined by measuring the mutual induction voltage. In order to detect the zero crossings, comparators are used and the comparator signals are evaluated by microcontroller.

Prior art FIG. 1 shows a block diagram of an electric motor 10 and a controller 12 that controls the electric motor.

Detection of the zero crossing requires the associated phase not to be supplied with current for a defined period in order to avoid covering the induced voltage. This so-called blanking gap, during which no current is supplied, needs to be chosen to be large enough to rule out the induced voltage being covered in different operating states of the motor. However, larger blanking gaps have an adverse effect on noise and power.

SUMMARY OF THE INVENTION

The invention is based on the object of using simple measures to optimize the electronic commutation in electric motors. In particular, the aim is to improve the sensorless commutation identification such that no power losses arise.

The method according to the invention can be used for sensorless commutation identification in electronically commutated electric motors, particularly DC electric motors. In order to rule out or minimize interfering influences for the commutation identification on account of a phase current that is still flowing, the phase current is interrupted for a blanking period, as a result of which the mutual induction voltage (back-EMF or BEMF) is present without voltage superimposition following the decay in the phase current. The method is suitable for dynamic length optimization or minimization of the blanking gap for electronically commutated electric motors.

The fundamental profile of the induced voltage in the motor is known per se, as a result of which the zero crossing can be inferred following the decay in the supply of current. In this context, zero crossing does not necessarily mean a zero potential, but rather also includes the crossing of the inductive voltage through mid-potentials. In the case of three phase voltages in the form of a star, the mid-potential is the one in the star point that corresponds to half the supply voltage.

By way of example, the zero crossing can be ascertained by means of comparators. The output signal (BEMF signal) from the comparator is evaluated by means of a microcontroller, for example.

In order for the blanking period in which the phase current is interrupted to be kept as short as possible and hence particularly for the power of the electric motor to be improved, but the noise produced also to be reduced, a decay time that denotes the decay in the phase current is ascertained within the blanking period from the profile of the mutual induction voltage, and the beginning of the blanking period is determined as a function of the time difference between this decay time and the end of the blanking period. The blanking period is accordingly denoted by three times, namely the beginning of the blanking period, at which the phase current is switched off, the end of the blanking period, at which the phase current is switched on again, and an intermediate decay time within the blanking period, at which the phase current has decayed to below a limit value after it has been switched off.

The method according to the invention involves the blanking period, that is to say the time difference between the beginning and the end of the blanking period, being kept as short as possible. This is achieved by determining the time difference between the decay time and the end of the blanking period and thus ascertaining the beginning of the blanking period as a function of this time difference, as a result of which the blanking period is minimized.

In the case of the method according to the invention, the blanking period is therefore not constant, but rather is progressively determined or updated on a variable basis, as result of which the system or ambient conditions such as temperature and voltage or other operating states can be taken into account and at the same time the blanking period is kept as short as possible by virtue of the variable adjustment. This is made possible by virtue of the beginning of the blanking period being set on a variable basis.

According to one expedient embodiment, the beginning of the blanking period is brought forward if the time difference between the decay time and the end of the blanking period is reduced in comparison with a reference value. In this case, the time difference is too small and it is necessary for the beginning of the blanking period—which coincides with the switch-off time—to be shifted to a prior, earlier time. By contrast, the beginning of the blanking period is shifted to a later time if the time difference between the decay time and the end of the blanking period—the time at which phase current is switched on again—is increased in comparison with a reference value. Hence, both for the case of a reduced time difference and for the case of an increased time difference, there is an apparatus available for adjusting the blanking period by taking account of the current state or system conditions.

The reference value that forms the basis of the comparison with the time difference between decay time and end of the blanking period is expediently a system variable or function, which is dependent on the speed of the electric motor, however. On the basis of the current speed, the reference value changes, particularly such that the reference value rises or falls with the speed. The relationship between the reference value and the speed of the electric motor is linear.

It is fundamentally conceivable to also have a dependency on further state or operating variables of the electric motor, for example on the temperature.

The reference value can be prescribed either as an absolute variable or as a relative variable. In the case of an absolute variable, the reference value is a system-specific value, as described previously, that may be dependent on a state variable or parameter of the electric motor, particularly the speed of the motor. In the case of a relative variable, the reference value may be dependent on the value from the preceding calculation cycle, wherein relative discrepancies that exceed a defined percentage result in adjustment of the beginning of the blanking period, whereas relative discrepancies below the percentage threshold value do not result in any adjustment, which means that the beginning of the blanking period remains unchanged.

The value by which the beginning of the blanking period is shifted to a prior or later time can also be ascertained in different ways. According to one simple embodiment, the beginning of the blanking period is shifted by a constant absolute value. According to an alternative, advantageous embodiment on the other hand, the beginning of the blanking period is shifted by a variable absolute value that is determined particularly as a function of the time difference between the decay time and the end of the blanking period. By way of example, the absolute value by which the beginning of the blanking period is shifted can be ascertained as a fraction of the time difference between the decay time and the end of the blanking period.

The method is expediently executed in a regulator or controller that is associated with the electric motor. The term "electric motor" is also intended to cover electric machines that are used as generators.

DETAILED DESCRIPTION

Figure 1:
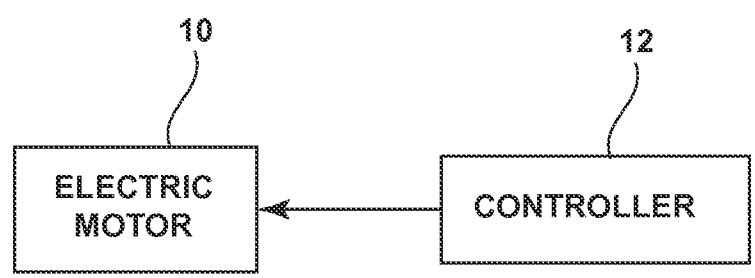
FIG. 1 is a prior art block diagram showing an electric motor and a controller.

Further advantages and expedient embodiments can be found in the further claims, the description of the figures and the drawing, which shows a graph with the time-dependent profile of the phase voltage, the star point voltage and the BEMF signal in the supply of current in an electric motor.

Figure 2:
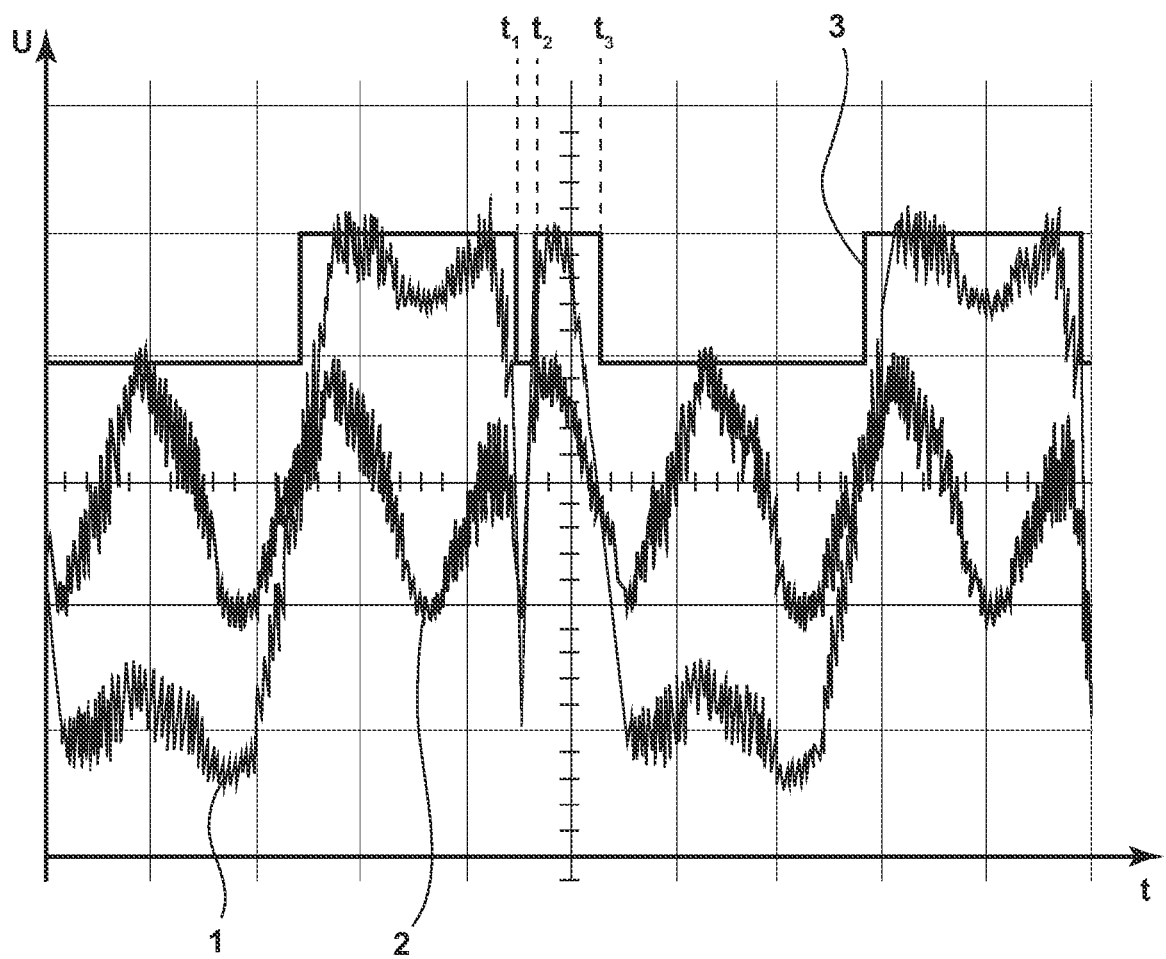
FIG. 2 is a graph showing three curve profiles.

The graph of FIG. 2 shows three curve profiles with voltage values that occur when an electronically commutated electric motor is supplied with current. Curve 1 shows the phase voltage in a star circuit for supplying current to the electric motor, curve 2 shows the star point voltage and curve 3, which has the shape of a square-wave signal, shows the BEMF signal that can be ascertained by means of a comparator, the BEMF signal 3 being present as an output signal on the comparator to which the phase voltage 1 and the star point voltage 2 are supplied as an input signal.

For the purpose of sensorless commutation identification, the zero crossing of the induced voltage needs to be ascertained, which is accomplished using the BEMF signal 3. Since the BEMF signal 3 is disrupted by superimposition with the phase current during the supply of current, the phase current needs to be interrupted for a blanking period, which occurs at time t1, which therefore marks the beginning of the blanking period. When the supply of current has been switched off, however, it is still necessary to await the decay of the current in order to rule out disturbances to the BEMF signal 3. At the decay time t2, the phase current has decayed sufficiently for no further significant disturbances to occur in the course of the BEMF signal 3. Hence, the period between the decay time t2 and the end t3 of the blanking period is the phase in which the BEMF signal 3 is uninfluenced by the phase current.

The time t3 marks the end of the blanking period, at which there is a zero crossing, which can be detected from the edge of the BEMF signal 3. At the end of the blanking period at time t3, the phase current is switched on again.

In order for the blanking period between times t1 and t3 to be kept as short as possible, the beginning t1 of the blanking period is shifted to a prior, earlier time or to a later time on a variable basis. The decision regarding whether a shift takes place and, if so, in what direction is dependent on the time difference Δt between the decay time t2 and the end t3 of the blanking period. If the time difference is reduced in comparison with a reference value, the beginning t1 of the blanking period is brought forward to an earlier time. If, by contrast, the time difference Δt between t2 and t3 is increased in comparison with a reference value, the beginning t1 is deferred to a later time. The reference value that is used for the comparison with the time difference Δt is advantageously a system-specific function that is dependent on the speed of the electric motor.

The level of the shift in the beginning t1 of the blanking period is advantageously stipulated on a variable basis and is determined particularly as a function of the time difference Δt between t2 and t3, for example as a fixed fraction of the time difference Δt.

Operation

Figure 3:
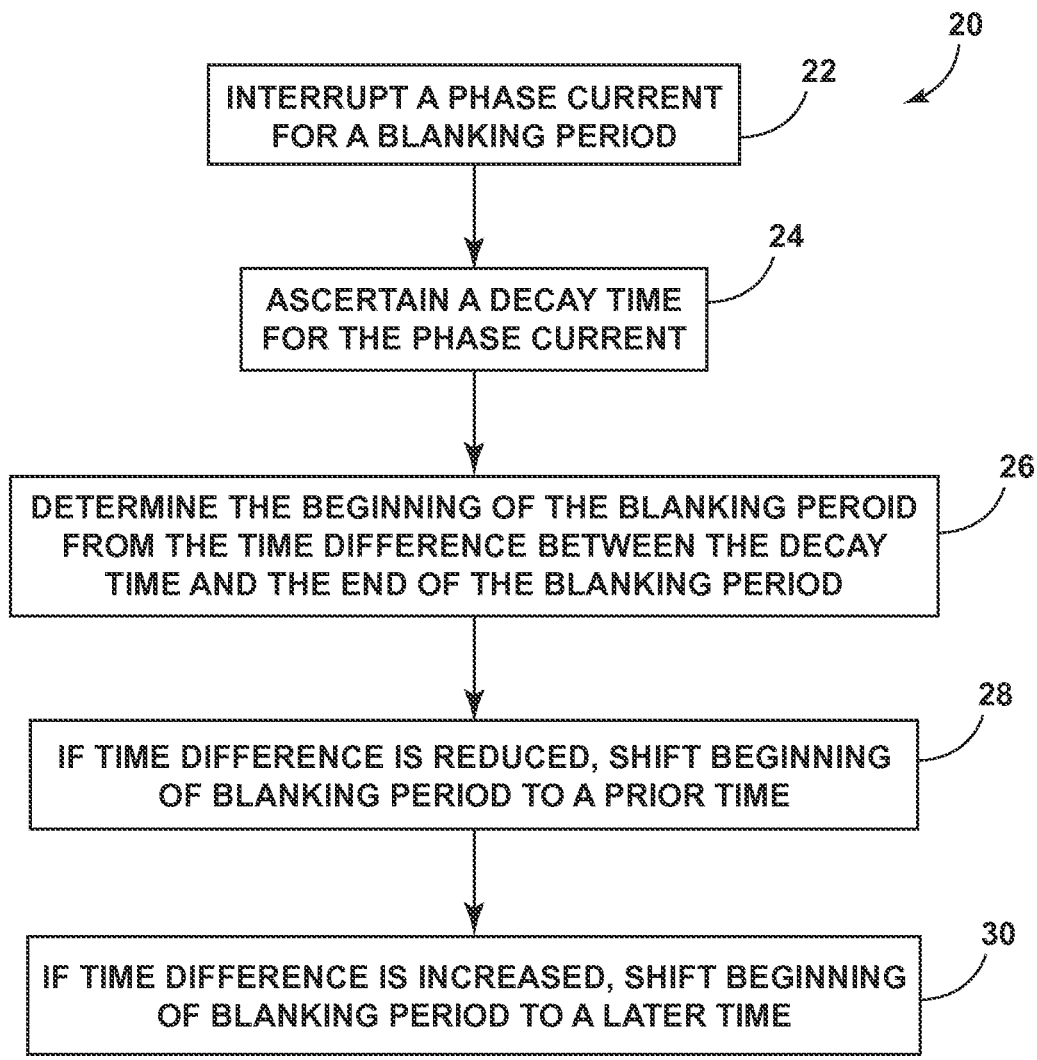
FIG. 3 is a flowchart showing operation of the method.

In the flowchart 20 of FIG. 3, the method for the sensorless commutation identification in electronically commutated electric motors includes the following steps. At step 22, the controller interrupts a phase current for a blanking period and advances to step 24.

At step 24, the controller ascertains a decay time denoting the decay in the phase current within the blank period using a profile of a mutual inductance. Then the controller advances to step 26.

At step 26, the controller determines the beginning of the blanking period as a function of a time difference between the decoy time and the end of the blanking period. The controller advances to step 28.

At step 28, the controller determines if the time difference between the decay time and the end of the blanking period is reduced. If so, the beginning of the blanking period is shifted to an earlier time and the controller advances to step 30.

At step 30, the controller determines if the time difference has increased. If so, the controller shifts the beginning of the blanking period to a later time. The method may repeat the steps shown in FIG. 3.

The invention claimed is:

1. A method for sensorless commutation identification in electronically commutated three-phase electric motors, in which a zero crossing is detected by interrupting a phase current for a blanking period, wherein a beginning of the blanking period occurs at a time of the phase current being interrupted and an end of the blanking period occurs at the time of the phase current being switched on, wherein a profile of a mutual induction voltage is used to ascertain a decay time denoting a decay in the phase current within the blanking period and to determine the beginning of the blanking period as a function of a time difference between the decay time and the end of the blanking period.

2. The method as claimed in claim 1, wherein the beginning of the blanking period is shifted to a prior time if the time difference between the decay time and the end of the blanking period is reduced in comparison with a reference value.

3. The method as claimed in claim 1, wherein the beginning of the blanking period is shifted to a later time if the time difference between the decay time and the end of the blanking period is increased in comparison with a reference value.

4. The method as claimed in claim 2, wherein the reference value is dependent on a speed of the three-phase electric motor.

5. The method as claimed in claim 2, wherein the reference value is formed from the time difference between the decay time and the end of the blanking period from a preceding calculation cycle.

6. The method as claimed in claim 2, wherein the beginning of the blanking period is shifted by an absolute value that is determined as a function of the time difference between the decay time and the end of the blanking period.

7. The method as claimed in claim 6, wherein the absolute value by which the beginning of the blanking period is shifted is determined as a fraction of the time difference between the decay time and the end of the blanking period, wherein the fraction of the time difference is less than the time difference.

8. A controller for carrying out the method as claimed in claim 1.

9. An electric motor in a vehicle having a controller as claimed in claim 8.

10. The method as claimed in claim 1, including outputting a square-wave signal, the square-wave signal changing at the zero crossings.

11. The method as claimed in claim 1, including detecting zero crossings without interrupting the phase current for a blanking period.

12. A method for sensorless commutation identification in electronically commutated three-phase electric motors by detecting zero crossings by interrupting a three phase current for a blanking period, comprising:
    interrupting the phase current at a beginning of the blanking period and an end of the blanking period occurs at the time of the current being switched on,
    ascertaining a decay time for the decay in the phase current within the blanking period, and
    determining the beginning of the blanking period as a function of a time difference between the decay time and the end of the blanking period.

13. The method as claimed in claim 12, wherein the beginning of the blanking period is shifted to a prior time if the time difference between the decay time and the end of the blanking period is reduced in comparison with a reference value.

14. The method as claimed in claim 12, wherein the beginning of the blanking period is shifted to a later time if the time difference between the decay time and the end of the blanking period is increased in comparison with a reference value.

15. A method for sensorless commutation identification in electronically commutated three-phase electric motors by detecting zero crossings by interrupting a phase current for a blanking period, comprising:
    interrupting the phase current at a beginning of the blanking period and an end of the blanking period occurs at the time of the current being switched on,
    ascertaining a decay time for the decay in the phase current within the blanking period,
    determining the beginning of the blanking period as a function of a time difference between the decay time and the end of the blanking period, and
    providing a square-wave shaped back-emf signal that changes value at the zero crossings.

\* \* \* \* \*